Aug. 13, 1974  J. HERMANNS  3,829,352
ARMORED FLAT GLASS AND METHOD OF MAKING IT
Filed Aug. 2, 1971  3 Sheets-Sheet 3

INVENTOR.
JAKOB HERMANNS
BY
Bauer and Seymour
ATTORNEYS

United States Patent Office 3,829,352
Patented Aug. 13, 1974

3,829,352
ARMORED FLAT GLASS AND METHOD
OF MAKING IT
Jakob Hermanns, Stolberg, Germany, assignor to Saint-Gobain Industries, Neuilly-sur-Seine, France
Filed Aug. 2, 1971, Ser. No. 168,016
Claims priority, application France, Aug. 4, 1970, 7028666
Int. Cl. B32b 5/12
U.S. Cl. 161—57                                14 Claims

ABSTRACT OF THE DISCLOSURE

Armored flat glass is made by simultaneously forming a continuous ribbon of glass and weaving the amor into it.

---

This invention relates to the manufacture of armored glass in which, for example, flat glass sheet is produced as a continuous ribbon, from a supply of molten glass, with a reinforcement of wire mesh, the wires usually extending obliquely to the centerline of the ribbon. The standard method of making such glass is to introduce a wire screen into the glass as the ribbon is formed, the wires of the screen being bonded together at their cross points to maintain the pattern. Numerous difficulties have plagued the product and the process: The screen is not perfectly formed, the wires are not equally taut between cross points, and this leads to deviations and impairment of appearance. When the screen is introduced into the molten glass gaseous bubbles form or are entrapped at the soldered cross points and are not only visible in the product, but weaken it at such locations; the sharp thermal shock which occurs during introduction of the screen into the glass tends to generate fissures in the glass near the cross points; such defects are especially damaging when the glass is to be made perfectly transparent by mechanical polishing or by fire polishing, its transparency revealing the bubbles and fissures, and the bubbles and fissures leading to cracking during surface working. The past processes have also been plagued with problems related to the introduction of the screen, its planeity, and its proper location in the ribbon, leading to complexity of apparatus and imperfection of result.

The objects of this invention are to overcome all such faults of the prior art, to simplify the manufacture of armored glass, and to produce an improved product.

The objects of the invention are accomplished generally speaking by weaving a pattern of wires crisscross into the glass ribbon as it is formed. In the preferred form of the invention novel apparatus two lines of wires moving in opposite directions are led into the molten glass of the ribbon as it is formed. The wires are maintained in parallelism, are moved in two lines in opposite directions transversely to the glass ribbon, and are put into the molten glass just before the ribbon is formed. When each wire reaches the edge of the ribbon it is moved into the line moving in the other direction. The individual wires upon introduction are immediately immobilized by the glass.

The novel apparatus which accomplishes the weaving of the wires into the glass, in its preferred mode is characterized by rotary mandrels having spiral lands and grooves which receive the wires and guide them, square threading being preferred.

The principles upon which this invention is based allow it to be used to make all common types of armored glass, it produces types not previously known, and it is useful with all methods of producing flat glass to armor their products. As a commonly used method of making glass forms the ribbon from a source of molten glass by passing it between rollers, the invention will be described in its application to such a system without detracting from the generality of its application. For instance when the molten glass from a furnace passes between two rollers to form the sheet the novel process admits the wires to the glass just upstream of the bite of the rollers; the process is equally useful when two thin glass sheets are formed and receive the armor between them while still in a plastic condition; in the flotation process, in which the glass assumes its final form on the surface of a bath of molten metal the wires are more readily introduced, and there are many advantages compared to prior art efforts to make armored glass by the flotation process: As there are no soldered joints, and no traces of oxides at the joints or on the wires there is no danger of forming gas bubbles, the crossed wires can still slide with respect to each other in the molten glass, and this eliminates the forming of cracks at cross points, every wire is under tension all the time and this preserves a perfect alignment of wires and produces a product having a perfect pattern.

By the novel process and apparatus the nature of the pattern may be changed, e.g. by changing the dimensions or shape of the apertures of the armor pattern by using mandrels of different thread pitch, by which the size is enlarged or reduced. By rotating the threaded mandrels at different speeds relative to the speed of the ribbon one can change the shape of the apertures, for instance to a lozenge from a square. The invention can also be used to introduce armor of types the introduction of which was not feasible using a preformed mesh.

In the mode of the invention herein described the two lines of wires are brought together upon and move across the surface of a cylinder a generatrix of which is between the threaded mandrels and the ribbon-forming rollers and aligned with and parallel to the center of the glass ribbon being formed.

German Pat. 481,880 describes an apparatus for forming wire mesh of prior art type with mesh soldered at the cross points, including a rank of bobbins on the surface of a rotary drum for feeding wire to make the mesh, and having threaded mandrels to cross the wires, each mandrel having at its end a means for transferring each wire around the ends of the mandrels to the rank of wires proceeding in the other direction but that appartus was not useful in combination with a glassmaking furnace nor was it ever conceived of that the wires could be woven into the glass as the ribbon was formed, and not be preformed into a mesh. The novel apparatus of this invention employs certain aspects of that prior apparatus in combination with apparatus of known type for forming glass ribbons to achieve novel, simple, and valuable advancements in the manufacture of armored glass of novel, and also of known types. As the apparatus of the German patent could not be used for this purpose as it existed, it was an object of the invention to develop apparatus capable of being used in combination with glass manufacturing apparatus at the temperature involved.

The novel apparatus employs two threaded mandrels disposed in a horizontal plane in combination with a guide cylinder of idler (undriven) type which holds the individual wires in the grooves of the threads. Furthermore novel means to transfer the wires around the ends of the guide cylinder has been perfected including a disk at each end, rotating around an axis parallel to the axis of the guide cylinder and thereabove; on each disk is disposed, on a circle concentric with the axis of a disk, sliding fingers arranged in abutting relation under the action of a spring and operated by a ramp mounted behind the disk to control it in working position.

It is advantageous to mount the two threaded mandrels, the guide cylinder, and the transfer disks on one chassis in order to be able to mount the whole unit in position and at the height of the formation of the glass ribbon.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is an elevational view partly in section of an apparatus embodying the preferred form of the invention;

Figure 2:
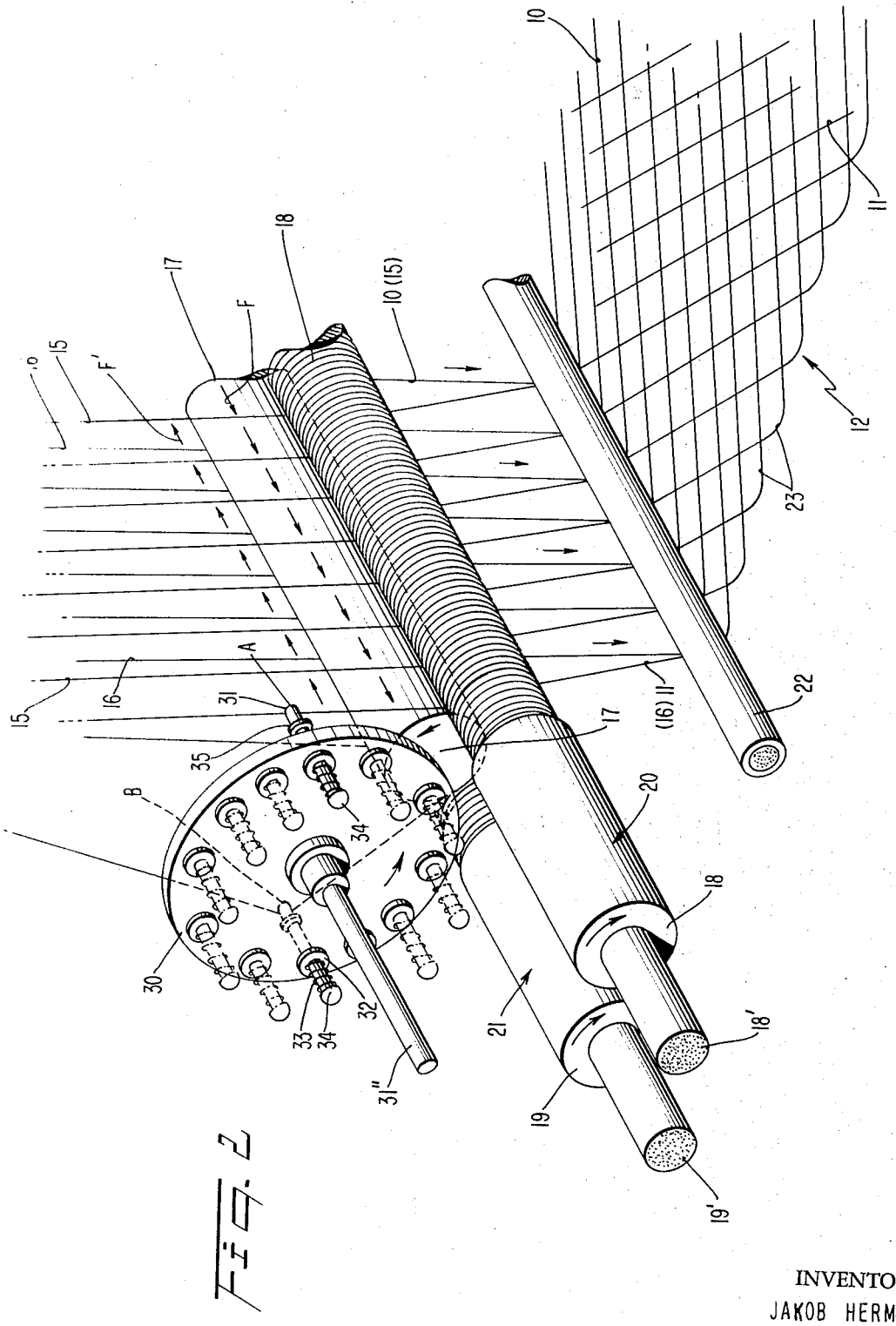
FIG 2 is a perspective view of certain parts of the installation of FIG. 1, showing details.
Figure 4:
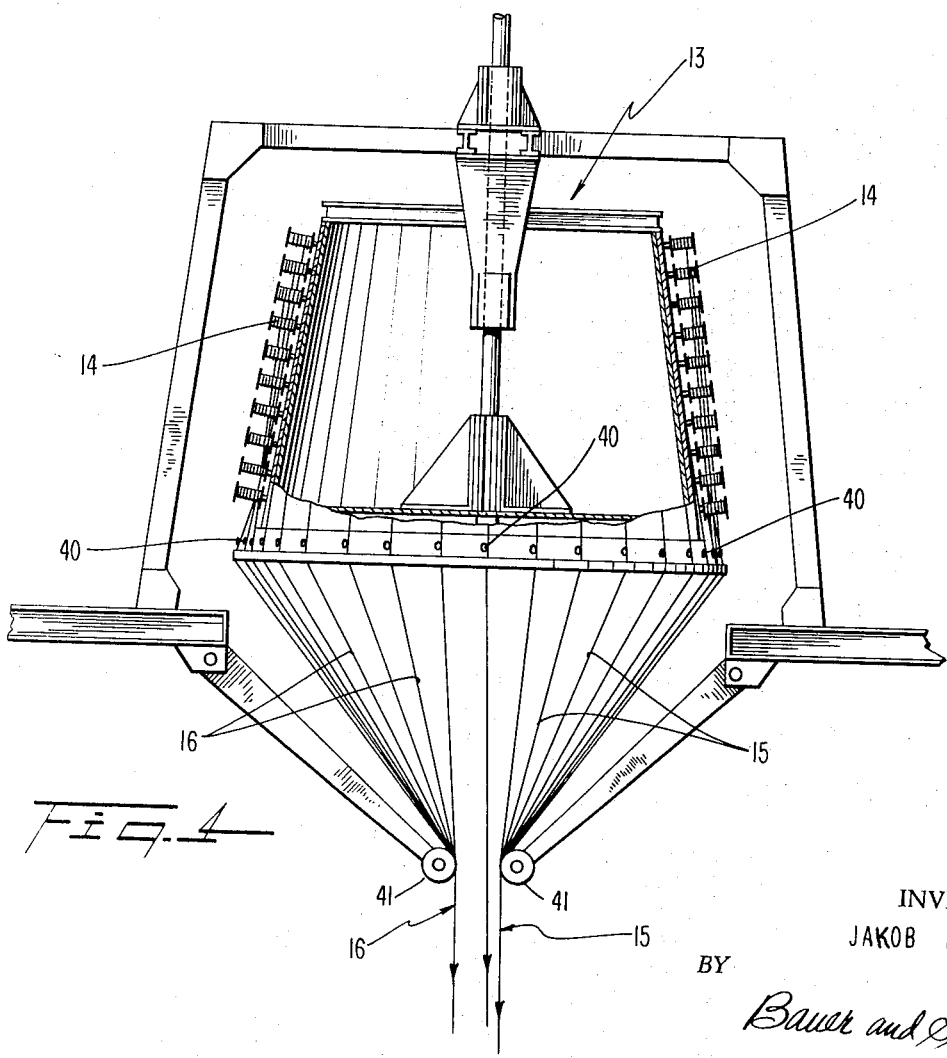
FIG. 4 is a perspective elevation of the feeding drum which supplies the wire armor.

Referring to the numerals of the drawing in which like numbers refer to like parts, a glass melting furnace 1, having a depending end wall 2, a bottom 3, and a discharge lip 4 delivers molten glass 5 to a pair of ribbon forming rollers 6—6 which press out the ribbon of flat glass 7, which glides down the ramp 8 and is transferred to the first of supporting rollers 9 upon which the ribbon is cooled to surface hardness. The wires 10–11 are to be woven into the glass in a pattern 12 such as is illustrated in FIG. 2. In order to accomplish this a rotary drum 13 (FIG. 4), upon which spools 14 of wire are mounted, delivers wires in two ranks 15–16 to opposite sides of an idler cylinder 17 and to two spiral threaded mandrels 18–19 which rotates in the same direction (arrows FIG. 2) but have oppositely pitched threads, those of mandrel 18 being pitched in one direction and those of mandrel 19 being pitched in the other. The wires of rank 15 fit into the spiral grooves of mandrel 18 and those of rank 16 into the grooves of mandrel 19, the ranks being carried toward opposite ends of the mandrels and held in their respective grooves by the cylinder 17. The mandrels have enlargements 20–21 at each end furnishing abutments which restrain the cylinder 17 against endwise movement.

In the apparatus thus far described there are two ranks of wires, one rank progressing toward the left, each under the control of the spiral grooves in its own mandrel; as the grooves progress toward the respective ends of their mandrels they carry the wires with them.

Figure 1:
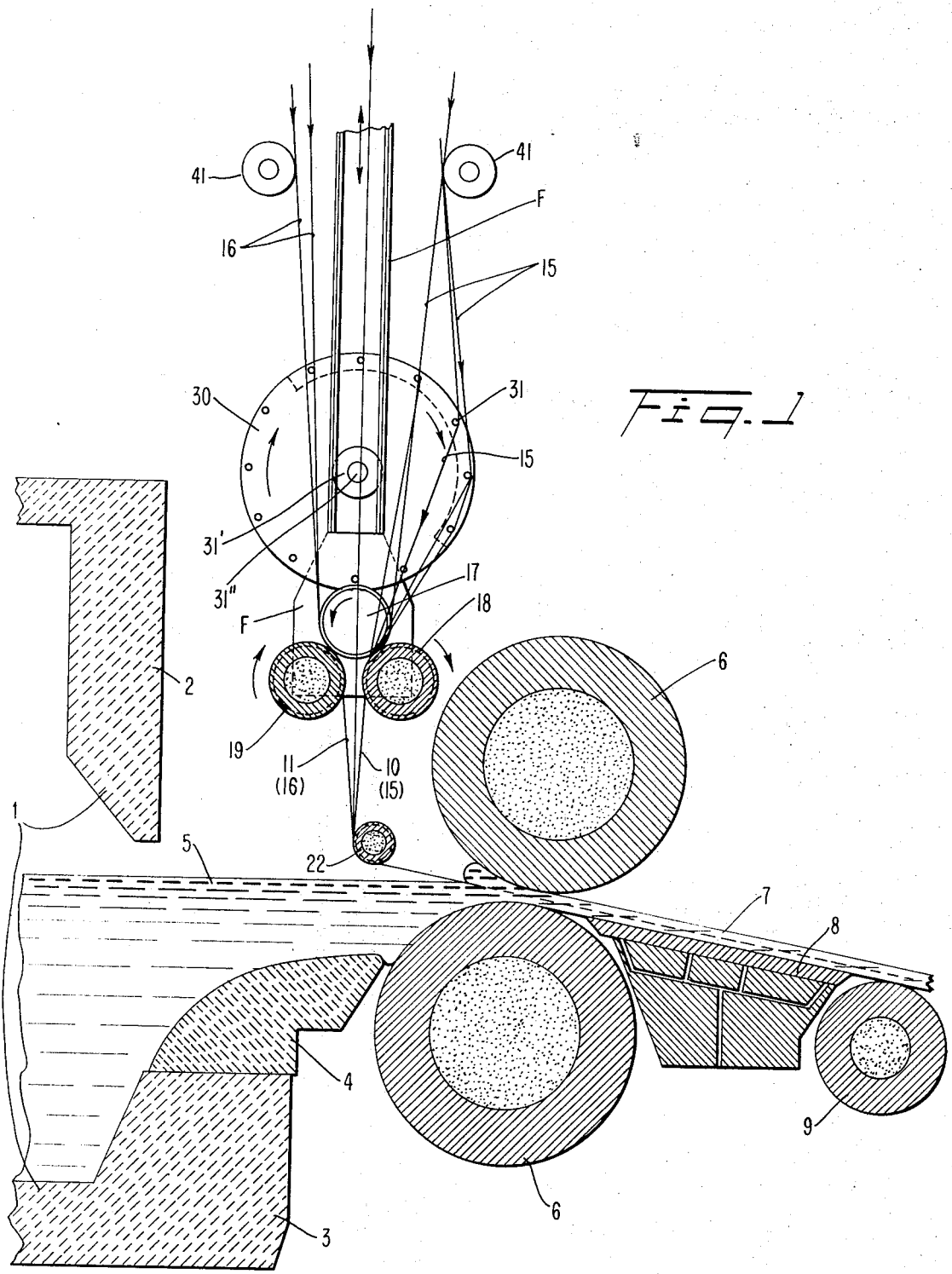
Figure 3:
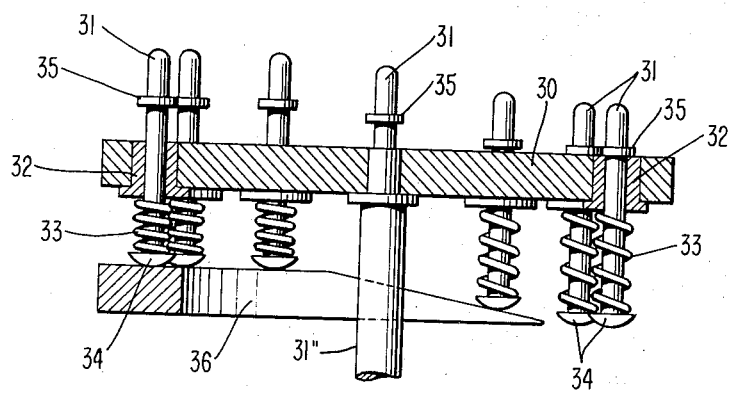
FIG. 3 is a section through the end transfer apparatus.

After leaving the mandrels the ranks 15, 16 of wires pass to the surface of an idler roller 22 the lowest generatrix of which is parallel to and aligned with the central plane of the ribbon 7. The wires pass under the roller 22 and are delivered to the glass just upstream of the bite of the rollers 6—6 which form the ribbon of flat glass 7, each wire entering the glass independently of the others, all the wires of one rank moving progressively to the left and the other rank to the right and weaving the pattern of diagonal wires shown in FIG. 2. At the end of its course each wire of rank 15, progressing leftward, as shown by arrows on roller 17 of FIG. 2, is reversed in a loop 23 and progresses in the other direction. This reversal of direction is accomplished by the mechanism illustrated in FIGS. 1, 2 and 3.

As the spiral threads of mandrel 18 carry the wires of rank 15 to the end of roller 17 the wires are picked up by a rotary disk 30, which is carried by a spindle 31", and delivered to the screw threads of mandrel 19. A similar mechanism performs the same function at the other end of the mandrels, but rotating oppositely. Carried by each disk are pins 31 which are slidably mounted in bearings 32 and normally held in retracted position by springs 33 acting between the bearings and the heads 34 of the pins. Circular flanges 35 perform the double function of arresting the thrust of the springs when the pins are inoperative and of guiding the wires during transfer from mandrel to mandrel.

In the upper part of their course the pins seize, for example, the wires of rank 15 as they are carried by the threads of mandrel 18, one by one at the end of roller 17 and transfer them to mandrel 19. The wires are kept under tension, each at release moves past the pin which is to pick it up, is caught by the pin from behind, and is carried by the pin (FIG. 2) from position A to position B where it is thrust into a groove of mandrel 19 and begins its reverse course. The action of the pins is controlled by a ramp or arcuate cam 36 (FIG. 3) which compresses the springs 33 in sequence and moves the pins and their flanges 35 in position to control the wire during transfer, releasing the pin after the transfer has been accomplished. In the inoperative arc the pins are retracted out of the path of the wires.

The apparatus for feeding the wires to the apparatus above described is not novel and is shown only diagrammatically. It includes a large rotary drum 13 which turns synchronously with the other rotating parts of the apparatus, delivering wire from spools 14, under mild tension, to rollers 40, thence to rollers 41, which arranges them in the ranks 15 and 16, from whence they are led to the threaded mandrels. The diameter of the drum is such that the wires will pass the ends of roller 17 when released by the grooves. Between the rollers 40 and the rollers 41 are stretcher pulleys and pulley wheels which give the wires their tension and a precise position which insures that they will not be picked up by the wrong groove of the mandrel. This apparatus is a pulley wheel mounted on a lever kept under tension by a spring. This is important, especially during the transfer from one mandrel to the other. The entire apparatus may be mounted on a single movable frame of which one side is diagrammatically illustrated at F in FIG. 1, the shaft 31" being seated in its bearing 31' which is mounted in the frame, and the mandrels having bearing ends 18'–19' which are mounted in appropriate bearings in the frame. The roller 17 is free and driven by both mandrels. The roller 22 is mounted in the frame but with independent and precise adjustability to provide for precise alignment with the ribbon.

All the rollers and mandrels are hollow and may be supplied with appropriate cooling fluid to protect them from the heat of the molten glass, which can be assumed to be around 1000° C. Apparatus for supplying cooling fluid to such rollers is known.

It will be perceived that by this invention the armor is woven into the glass as it is formed, that all the problems which beset the use of wire mesh are eliminated, that the production of new types of armored glass is made possible, involving differences in pattern and, by the use of different types of wire of valuable differences in physical characteristics for different purposes.

The driving mechanism for rotating the drum, mandrels, disk and certain other rollers synchronously with the glass shaping rollers 6—6 is not shown, being conventional.

The invention is applicable to all the standard methods of making flat glass continuously, whether by rolling, drawing, flotation, or extrusion, to name the methods most commonly employed.

As many apparently widely different embodiments of the present invention may be made without departing from the spirit and scope thereof, it is to be understood that the invention is not limited to the specific embodiments.

What is claimed is:

1. Armored flat glass sheet containing a multiplicity of continuous and discrete strands of wire armor in crisscross arrangement, the wires being unconnected at their cross points, each wire extending from side to side and end to end of the sheet.

2. A method of making armored flat glass having a pattern of crossed wires which comprises concurrently and simultaneously forming the glass, weaving the wire into its pattern, and combining them into a continuous ribbon.

3. A method of making armored flat glass which comprises forming a sheet from molten glass and simultaneously linearly introducing a multiplicity of individual and unconnected strands into the molten glass of the sheet while moving the free portions of the strands back and forth laterally of the sheet to embed the strands in the sheet in a crisscross pattern.

4. A method of making armored flat glass which comprises forming a continuous sheet of flat glass from a supply of molten glass and moving the sheet progressively away from its place of formation, arranging a plurality of lines of mutually unconnected wires adjacent the place of formation of the sheet, introducing them into the sheet at its place of formation, moving one of the lines of wires transversely to the direction of motion of the sheet, and moving the other line of wires transversely to the direction of motion of the sheet but opposite to the direction of motion of the first line of wires, thereby forming a crisscross pattern of armor in the sheet, and cooling the sheet upon the armor.

5. A method of introducing armor into flat glass which comprises forming a ribbon of flat glass continuously from a supply of molten glass, introducing a strand of wire into the molten ribbon of glass, and feeding the strand into the ribbon from continually changing positions as the ribbon is progressively formed.

6. A method of introducing armor into flat glass which comprises rolling out a ribbon of flat glass from a supply of molten glass and drawing the ribbon away from its place of formation, introducing a strand of wire into the molten ribbon at its forming end and moving the strand progressively sidewise as the ribbon moves progressively away, introducing another strand of wire into the molten ribbon at its forming end and moving it progressively sidewise in the direction opposite to that of the first strand.

7. A method of introducing armor into a ribbon of flat glass which comprises introducing discrete strands into the glass at the place of formation of the ribbon while moving each strand cyclically back and forth across the ribbon at said place of formation.

8. A method of making armored flat glass which comprises weaving a multiplicity of discrete strands of armor wire into the glass in a crisscross pattern as molten glass is formed into a ribbon of flat glass.

9. Apparatus for making armored flat glass which comprises spiral grooved mandrels, an idler roller supported thereby, means to deliver ranks of wires to the roller and grooves, means to transfer the wires from one mandrel to the other past the ends of the roller, means to receive and align the ranks of wires as they leave the mandrels, and means to embed the wires in a ribbon of molten flat glass.

10. Apparatus according to claim 9 in which the transfer means comprises means to keep the wires under tension, rotary disk means supporting retractible pickup means, means to retract the pickup means out of the path of a wire released by one said mandrel, means to project the pickup means beyond the path of the wire after the released wire has passed the pickup means, and means to drive the disk means to force the pickup means against the wire and thrust the wire into a groove of the other said mandrel.

11. Apparatus for the manufacture of armored glass comprising means to form a ribbon of flat glass continuously from a supply of molten glass, and means to weave wire into the glass ribbon in a crisscross pattern as the ribbon is formed.

12. Apparatus for the manufacture of armored glass according to claim 11 in which the means to weave comprises a plurality of rollers having spiral lands and grooves progressing in opposite directions, means to supply wire to a groove of each roller, and means to insert the wires from the grooves into the glass as the flat glass ribbon is formed.

13. Apparatus according to claim 11 comprising ribbon forming rollers, means to supply molten glass to the rollers, and means to weave a plurality of wires with opposite motion into the glass between the rollers as the ribbon is formed.

14. Apparatus according to claim 13 in which the weaving means comprises two lines of discrete wires, means to move one line progressively in one direction transversely to the sheet, means to move the other line progressively in the opposite direction, and means to bring the oppositely moving lines into a single plane within the glass.

References Cited
UNITED STATES PATENTS

| | | | |
|---|---|---|---|
| 3,558,294 | 1/1971 | Touvay | 65—147 X |
| 812,994 | 2/1906 | Heidenkamp | 65—150 X |
| 1,632,363 | 6/1927 | Bull | 161—143 X |
| 3,346,359 | 10/1967 | Forster et al. | 65—148 X |

WILLIAM A. POWELL, Primary Examiner

U.S. Cl. X.R.

65—51, 148; 156—177, 178, 439; 161—140